United States Patent [19]
Davenport et al.

[11] Patent Number: 5,101,325
[45] Date of Patent: Mar. 31, 1992

[54] UNIFORM ILLUMINATION OF LARGE, THIN SURFACES PARTICULARLY SUITED FOR AUTOMOTIVE APPLICATIONS

[75] Inventors: John M. Davenport, Lyndhurst; Richard L. Hansler, Pepper Pike, both of Ohio; John L. Henkes, Lathan, N.Y.

[73] Assignee: General Electric Company, Schenectady, N.Y.

[21] Appl. No.: 496,485

[22] Filed: Mar. 20, 1990

[51] Int. Cl.$^5$ .............................. F21V 7/04
[52] U.S. Cl. ................................ 362/31; 362/26; 362/32; 362/61; 362/83.3
[58] Field of Search .............. 362/23, 26, 27, 31, 362/32, 61, 83.3; 350/334

[56] References Cited

U.S. PATENT DOCUMENTS

| | | | |
|---|---|---|---|
| 2,712,593 | 7/1955 | Merchant | 362/27 |
| 3,040,168 | 6/1962 | Stearns | 362/27 |
| 4,277,817 | 7/1981 | Hehr | 362/31 |
| 4,435,047 | 3/1984 | Fergason | 350/334 |
| 4,516,834 | 5/1985 | Cascini | 350/335 |
| 4,616,903 | 10/1986 | Fergason | 350/334 |
| 4,637,687 | 1/1987 | Haim et al. | 350/335 |
| 4,693,560 | 9/1987 | Wiley | 350/335 |
| 4,830,899 | 5/1989 | Nakahashi et al. | 362/31 |
| 4,909,604 | 3/1990 | Kobayashi et al. | 362/31 |
| 4,924,612 | 5/1990 | Kopelman | 362/32 |

FOREIGN PATENT DOCUMENTS 664193  1/1952  United Kingdom ............... 362/31

Primary Examiner—Ira S. Lazarus
Assistant Examiner—Sue Hagarman
Attorney, Agent, or Firm—George E. Hawranko; Stanley C. Corwin; Fred Jacob

[57] ABSTRACT

A thin, efficient and uniform illuminator for large areas comprises a plastic wedge of a series of plastic wedges applied to or formed integrally with a back surface of an area to be illuminated. Light is collected and concentrated from a high efficiency light source. The concentrated light is focused as an input to one or more light guides. The light guides may be optical fibers. The light guides or fibers are fused or mated in some other way to an edge or edges of an optically clear plastic wedge or wedges. The wedge shape increases the angle of the internal reflections of the edge coupled light per unit distance and intercepts more of the light as the wedge gets thinner. To further enhance the uniformity of the illuminating light, light scattering centers may be added to the surface or volume of the wedge. The number of scattering centers over the illuminating surface of the wedge or within the volume of the wedge may be increased along the distance moving away from the light source.

19 Claims, 6 Drawing Sheets

Fig. 4
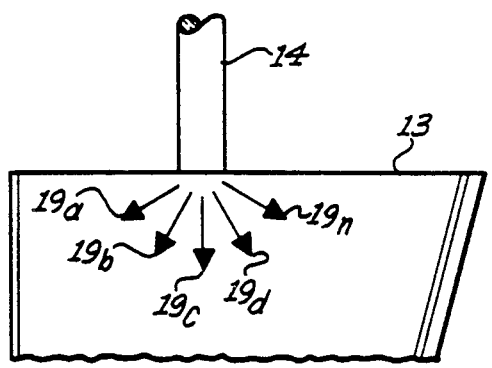
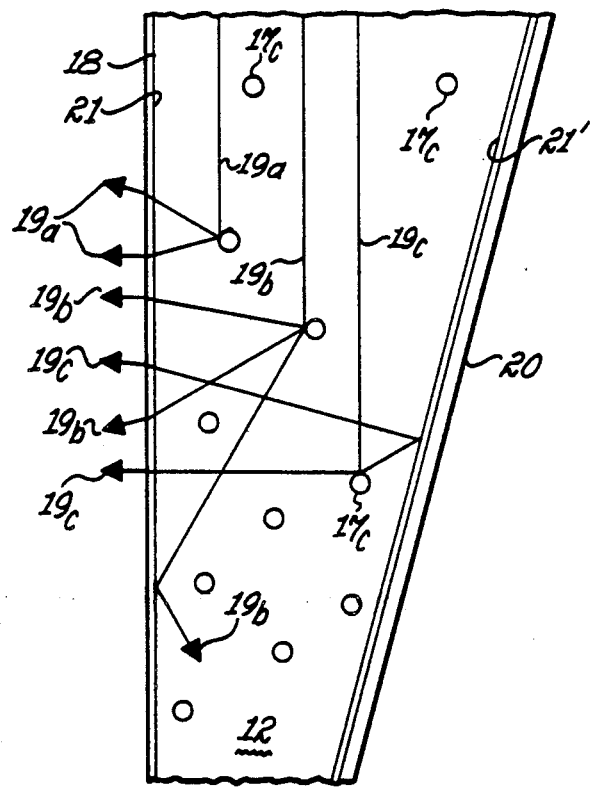

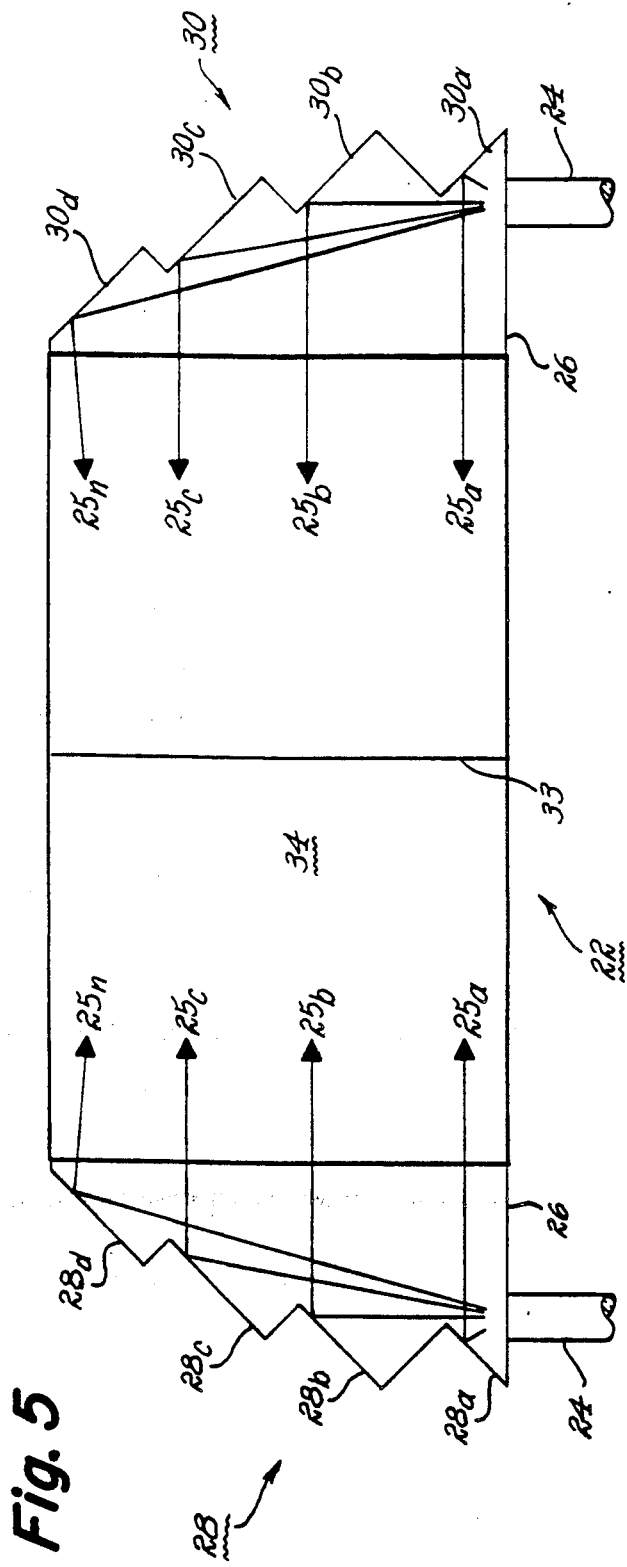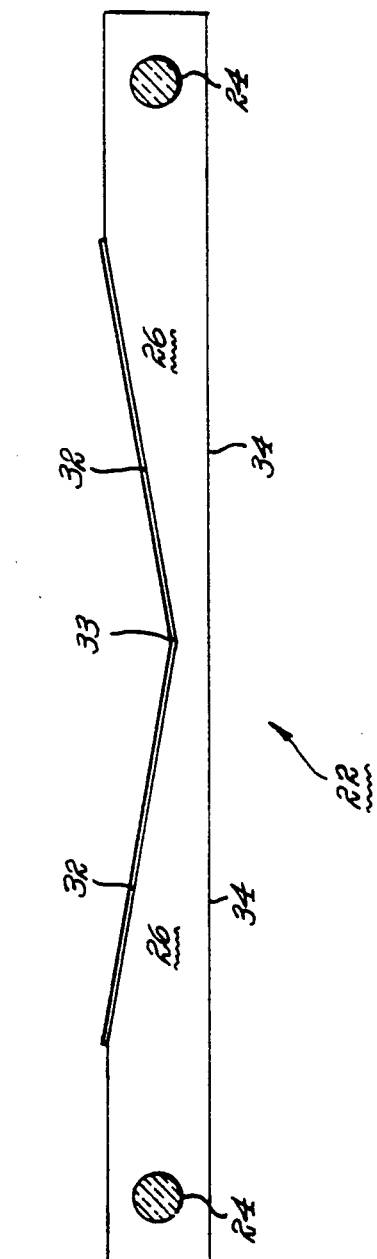

UNIFORM ILLUMINATION OF LARGE, THIN SURFACES PARTICULARLY SUITED FOR AUTOMOTIVE APPLICATIONS

BACKGROUND OF THE INVENTION

1. Field of the Invention

The present invention generally relates to the illumination of large surfaces and, more particularly, to providing uniform illumination over large areas at a shallow depth which is particularly suited for automobiles.

2. Description of the Prior Art

In modern industrial design, there are a number of applications which call for illuminating large surface areas but the distance perpendicular to the surface area to be illuminated which is available for a light source is small. The problem then is to provide uniform illumination of a thin panel at an acceptable cost.

In one such application, automobile manufacturers have been adding large decorative reflectorized areas on the rear deck lids of some of their models. The reflectorized areas blend in well with the rear lighting on the quarter panels and have a pleasing appearance during the day. At night, however, these areas appear dark and unattractive. To light these large areas with incandescent lamps presents two problems. First, it is difficult to get even illumination over such a large area using point sources such as incandescent lamps. Secondly, the large accelerations experienced by lamps mounted on the rear deck lid when it is closed are sufficient to deform or even fracture the filament of the lamp. Light emitting diode (LEDs) may very well serve as an alternative light source so as to solve such incandescent lamp problems.

In another application, liquid crystal displays (LCDs) are commonly used for a variety of applications ranging from personal televisions to computer displays. One of the principal reasons for the popularity of LCDs is their small size and low power consumption. Current illuminators for LCDs use fluorescent lamps of high efficiency and light box cavities to provide uniform illumination. To make LCDs more acceptable, the LCDs are now generally provided with a source of back lighting. In order to retain the advantage of LCDs being used as a thin flat panel display, this back lighting source must also be thin. This type of design must be of a certain minimum thickness due to the lamp size and light box cavity size to achieve a uniform backlighting of the display.

Another type of illuminator which achieves uniform illumination over a large area and yet is thin is manufactured by Lumitex, Inc. The Lumitex device uses a high efficiency light source and collects and concentrates this light by focusing it into an optical fiber bundle. The fibers of the bundle are fanned out and woven into a flat panel. Light is made to leak from the woven panel by sharp bending of the fibers in the weave pattern. The disadvantages of this device are its cost of construction and the lack of directionality of the leaked light and efficiency when designed to achieve a high degree of uniformity.

SUMMARY OF THE INVENTION

It is therefore a general object of the present invention to provide a device that provides uniform illumination over a large area of shallow depth.

It is another object of the invention to provide a thin, efficient and uniform illuminator for large areas.

It is a further object of the invention to provide an efficient means to collect and conduct light from a high efficiency light source and uniformly distribute and emit this light over a large area.

According to the invention, a plastic wedge or a series of plastic wedges are applied to or formed integrally with a back surface of an area to be illuminated Light is collected and concentrated from a high efficiency light source. The concentrated light is focused as an input to one or more light guides which may be optical fibers. The light guides or fibers are fused or mated in some other way to an edge or edges of an optically clear plastic wedge or wedges. The wedge shape increases the angle of internal reflections of the edge coupled light as the wedge gets thinner. In addition, the sloping back surface of the wedge intercepts more of the illuminating light beam as it progresses through the wedge toward its apex. To further enhance the uniformity of the illuminating light, the number of scattering centers over the illuminating surface of the wedge or within the volume of the wedge are increased along the distance away from the light source.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is an enlarged cross-sectional view of the wedge shaped illuminating device showing scattering centers in the volume of the wedge;

FIG. 5 is a top view of a double wedge embodiment of the invention;

FIG. 6 is an end view of the double wedge embodiment shown in FIG. 5; and

DETAILED DESCRIPTION OF THE PREFERRED EMBODIMENTS OF THE INVENTION

Figure 1:
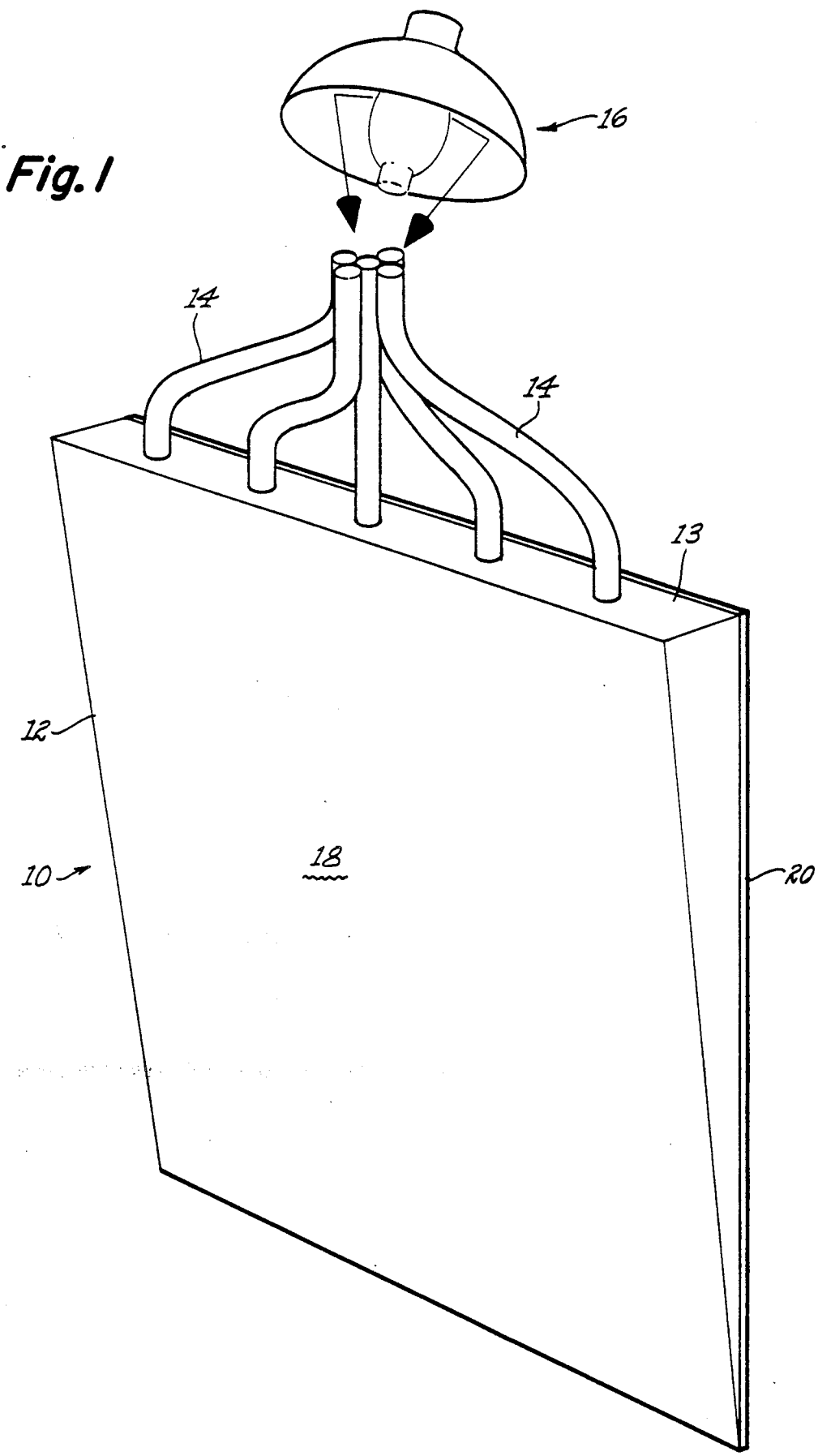
FIG. 1 is an isometric drawing of the basic wedge shaped illuminating device according to the invention.

Referring now to the drawings, and more particularly to FIG. 1, there is shown a basic form of the illuminating device 10 according to the invention. The illuminating device includes a transparent plastic wedge 12. The wedge may be made of a moldable thermoplastic such as, for example, acrylics, polycarbonates or polystyrenes. Along a rectangular edge 13 of the wedge 12 are a plurality of optical fibers 14. The optical fibers 14 terminate in a common bundle which is positioned to collect concentrated light from a high efficiency source 16 which may be, for example, an arc lamp centrally located in a reflector preferably having a spherical shape. The coupling between the ends of the fibers !4 and the wedge 12 may be made by melting them together or mated in some other way so as to reduce any reflection losses and which provides for the light from the fibers to spread out in a direction perpendicular to the direction of the beam so as to provide uniform illumination over the front or light emitting surface 18. For the various applications of device 10, the front surface 18 is arranged to be co-extensive with the area to be illuminated. The back surface 20, shown in more detail in FIG. 2, of the wedge is coated with a reflecting coating. Preferably, this reflecting coating is a diffuse reflector such as Barium Sulfate, BaSO$_4$, as manufactured by Kodak of Rochester, N.Y., for this purpose. Alternatively, the reflecting coating may be a specular reflector, such as sputtered aluminum, but this generally does not produce as good a result as a diffuse reflector.

Figure 2:
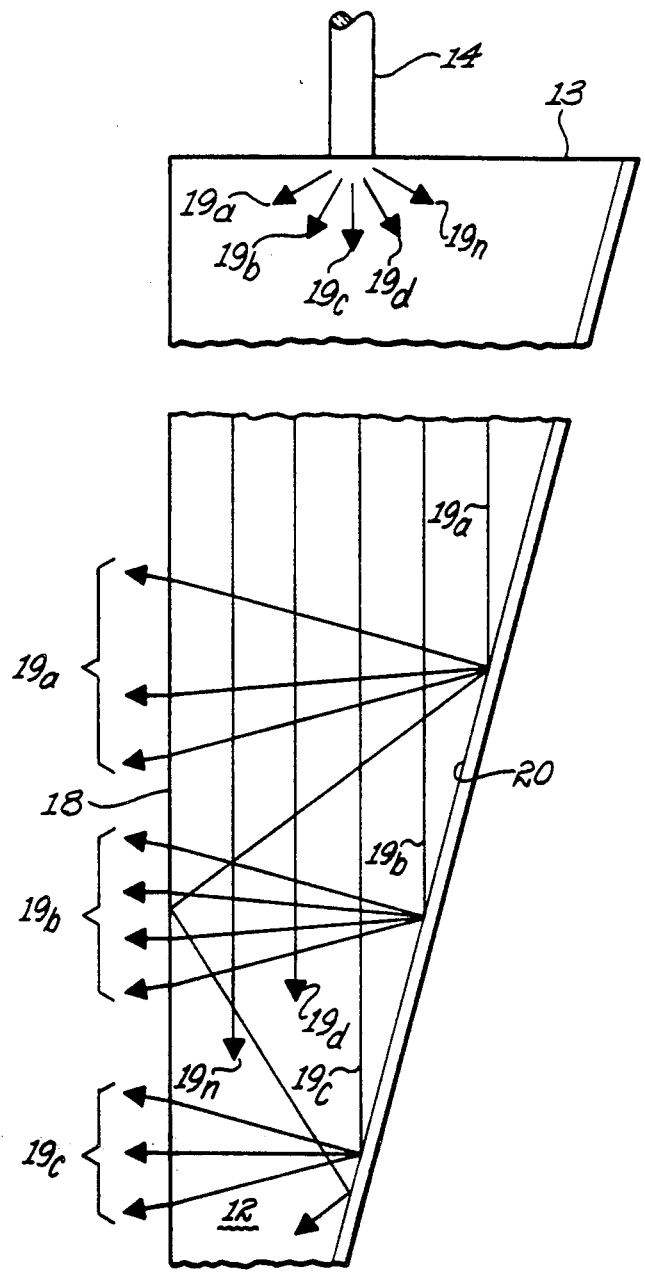
FIG. 2 is an enlarged cross-sectional view of the wedge shaped illuminating device shown in FIG. 1 illustrating the internal reflections of light within the device.

FIG. 2 illustrates the reflections of light from one of the optical fibers 14 located at the rectangular edge 13 within the volume of the wedge 12. FIG. 2 illustrates the back surface 20 in a different manner than it was shown in FIG. 1 in that back surface 20 now converges relative to the light emitting surface 18. The challenge in illuminating a large area represented by illuminating device 18 is to make the illumination fairly uniform. To accomplish this by the practice of the present invention using edge lighting techniques, two principles are combined. First, the wedge 12 increases the angle of the reflections per unit distance as the wedge gets thinner and the back or reflecting surface 20 intercepts more of the light beam, shown as rays 19a, ... 19n emitted from fiber 14 located at surface 13, as such a beam travels toward the apex of the wedge. Second, the number of scattering centers, related to the light emitting surface 18, which send light off in all directions as shown by groups of rays 19a ... 19n being emitted from surface 18. The scattering effect increases in the direction away from the source 14. The reflector or reflective coating on the back surface 20 ensures that all of the light not absorbed by the reflector is reflected by the reflector and comes out through the front surface 18. Either principle by itself provides some improvement in uniformity so that in some applications, only one or the other might be used.

Figure 3B:
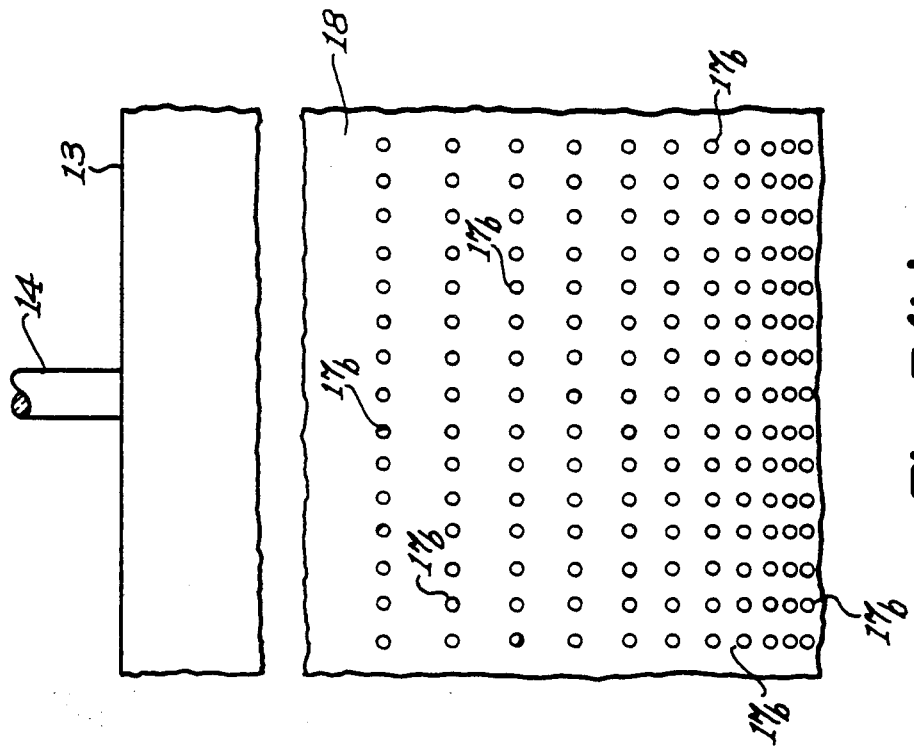
FIGS. 3A and 3B are enlarged portions of the light emitting surface of the wedge shaped illuminating device showing scattering centers on the surface.
Figure 3A:
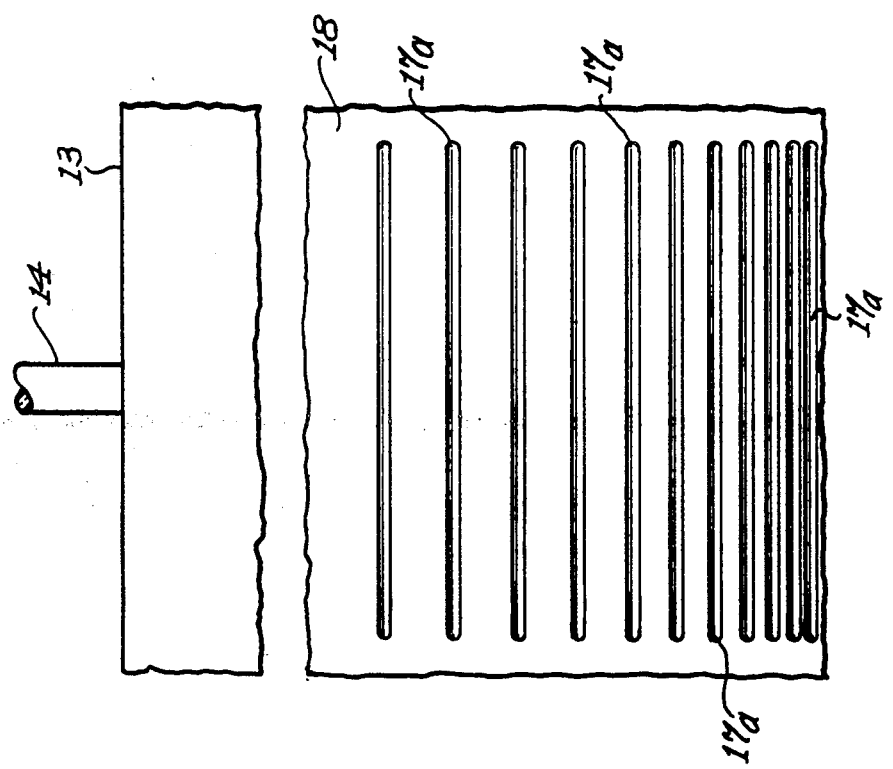

The scattering sources may be formed on the front surface 18, by scratching or grooving or coating the surface 18, where the density of scattering sources is low near the source 14 of the light and increases as the distance from the source increases. The scattering sources are illustrated in FIGS. 3A and 3B which show, respectively, grooves 17A and pits 17B as scattering sources which preferably increase in frequency of occurrence or density over the surface as their location moves away from the source of illumination 14 located at rectangular edge 13.

Alternatively, the scattering sources may be formed within the volume of the material, again with the guideline that the related density increases as the distance from the source increases. This is illustrated in FIG. 4 which shows scattering particles 17c within the volume of the wedge 12. The scattered light rays are shown as groups 19a ... 19c which are composed of individual rays 19a ... 19n that are emitted from optical fiber 14 at rectangular edge 13. These particles may be passive or inert types mixed with the thermoplastic material and allowed to gradually settle toward the apex end of the wedge before curing the plastic thereby producing the increasing density of such light scattering centers as generally illustrated. The particles could be encapsulated liquid crystals such as those described in U.S. Pat. Nos. 4,435,047 and 4,616,903 to Fergason and produced by Taliq Corp. of Sunnyvale, Calif.

Transparent electrodes 21 and 21' are applied over the front and back surfaces 18 and 20, respectively, of the wedge 12 for the purpose of applying an electric field. The application of an electric field has the effect of aligning the liquid crystals parallel to the direction of the field, in contrast to its normally structurally distorted shape in the absence of a field. When an electric field is present, the liquid crystals become more transparent, as their transparency is a function of the strength of the electric field. If the liquid crystals are nonuniformly distributed through the volume of the wedge, the application of a uniform electric field across the volume controls the light scattering effect desired. On the other hand, the use of encapsulated liquid crystals allows for some flexibility of manufacture. Specifically, the encapsulated liquid crystals may be uniformly distributed within the volume of the wedge 12 and a nonuniform electric field applied across the wedge to produce the effect of an increasing density of light scattering centers. In other words, by appropriately selecting the electric field applied across the envelope, the illuminating light emitted from the front surface 18 of the wedge 12 may be made more or less uniform as desired by the application.

When the illuminating device according to the invention is used to illuminate, for example, an applique (cut-out decoration fastened to a larger piece of material) on the rear deck of a car, the applique may be formed by molding plastic such that the back surface forms a series of wedges relative to the front surface and such that each wedge may be illuminated by means of fiber optics at the thick end or edge of the wedge. The back surface is roughened and coated with the previously discussed diffuse reflector so that all of the light not absorbed by the back surface is reflected by the back surface and comes through the front surface 18 of the applique. The purpose of the wedge shape is to provide illumination through the front surface 18 which is as uniform as possible. If it is desired that the applique be reflective, it may be made in two layers, the outer layer of which is provided with the usual corner cube reflective surface on the back, while the second layer has the wedge construction as generally shown in FIG. 1.

For very large areas, such as the back of a car, it may be necessary to have a series of illuminators, each fed by its own source, for example the end of an optical fiber. As mentioned and as shown in FIG. 1 with regard to reference number 16, the source of light into the fibers may be a discharge lamp light source centrally located with the reflector or a similar high efficiency light source. Unlike the incandescent lamp discussed in the "Background" section, such discharge lamp may be mounted on the deck lid without fear of high acceleration, since there is no filament to fail.

It will be appreciated by those skilled in the art that there are several variables that must be considered in the practice of the invention. The first of these is the nature of the light beam introduced into the plastic wedge 12. Generally, it is preferred that the light beam be collimated, or nearly so, to achieve the best uniformity of illuminating light emitted from the front surface 18 of the wedge. Secondly, the thickness and the angle of the wedge should be determined for the specific application. And finally, when used, a decision must be made on the location and distribution of light scattering centers, either over the emitting surface 18 or within the volume of the wedge 12.

A practical example of the invention is shown in FIGS. 5 and 6 which illustrate a double wedge illuminating device 22 fabricated to illuminate an automobile speedometer. The speedometer itself was fabricated using LCD technology, and the double wedge structure was used to backlight the LCD. In the embodiment shown in FIGS. 5 and 6, light is collected and concentrated from a high efficiency light source (not shown) as before. The concentrated light is focused as an input to a pair of light guides 24 which transmit light, shown in FIG. 5 as rays $25a \ldots 25n$, into edges 28 and 30 of the double wedge 26. The edge 28 is comprised of portions 28A, 28B, 28C and 28D, whereas, edge 30 is comprised of portions 30A, 30B, 30C and 30D. The double wedge shape is best seen in FIG. 6 in which the two wedge portions 26 are joined at a common edge 33. The illuminator 22 having the back (32) and front (34) surfaces of each wedge 26 converge and the front surfaces 34 of the two wedges 26 forming a common illuminating surface conforming to a surface that is to be illuminated. As shown in FIG. 5, the expanding beams of light $25a \ldots 25n$ are intercepted by serrated edge portions 28A ... 30D which reflect the light rays toward the thinner central part of the double wedge 26. The surfaces of the serrated edges 28 and 30 are coated with a specular reflector, such as sputtered aluminum. In the illustrated embodiment, the serrations are designed such that the light beams $25a \ldots 25n$ are divided into seven parts of roughly equal lumens. The seven distributed light beams of the serrated edges 28 and 30 are reflected by the back surface 32 (FIG. 5) of the double wedge and are emitted from the front surface 34 (FIG. 6) in the same manner as the generalized structure shown in FIG. 1.

Figure 7:
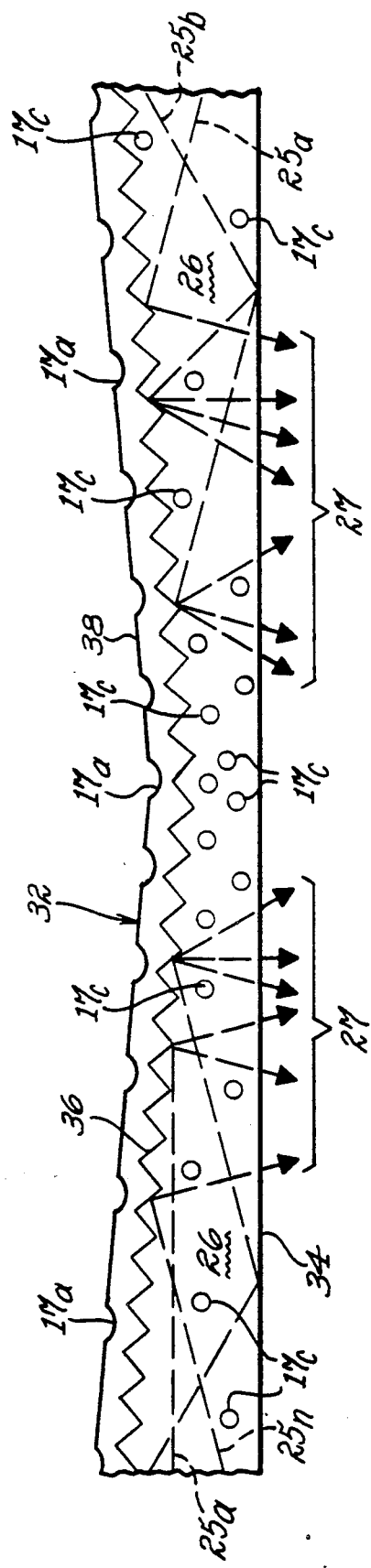
FIG. 7 is an enlarged cross-sectional view of the double wedge embodiment shown in FIGS. 5 and 6 illustrating the internal reflections of light within the device.

FIG. 7 shows in more detail the back surface 32 of the double wedge 26 shown in FIG. 6. The back surface may be grooved by means of grooves 17A, discussed with regards to FIG. 3A, perpendicular to the direction from which the light (shown by rays $25a$ and $25n$) is propagated from so as to form a surface that is stepped with 45° risers 36. The risers 36 intercept light rays $25a$ and $25n$ and redirect the light through the front surface 34 into groups of light rays 27. An alternative to grooving (17A) the back surface 32 is to texture the front surface 34 by simple rough sanding. The purpose of the sanding is to defeat total internal reflection and scatter the light striking this surface thereby allowing the light to escape. Except for the desired illuminating surface 34, the entire plastic form of wedge 22 is coated with a diffuse reflective coating 38 to assure that any light which is not totally internally reflected is returned to the plastic cavity of wedge 22 and contributes to the output of wedge 22.

While the embodiment shown in FIGS. 5 and 6 is particularly advantageous for use as a back light source for LCDs, such as the automobile speedometer mentioned, this particular embodiment of the invention may be used wherever uniform illumination of a large surface area is desired. Therefore, while the invention has been described in terms of preferred embodiments, those skilled in the art will recognize that the invention can be practiced with modification within the spirit and scope of the appended claims.

What we claim as new and desire to secure by Letters Patent of the United States is:

1. An illuminator for large surface areas comprising:
    a transparent wedge having back and front surfaces and a generally rectangular shaped edge between said surfaces, said front surface being co-extensive with an area to be illuminated;
    a high efficiency light source;
    at least one light guide optically coupling light from said light source to said rectangular shaped edge so that light entering the wedge is internally reflected from the back surface and emitted from said front surface, and,
    wherein said wedge is provided with scattering centers throughout its volume and said scattering centers are encapsulated liquid crystals and further comprising means for applying an electric field across said front and back surfaces of said wedge.

2. The illuminator according to claim 1 wherein said wedge is of a plastic material.

3. The illuminator as recited in claim 2 further comprising a reflective coating applied to said back surface.

4. The illuminator as recited in claim 3 wherein said reflective coating is of a diffuse type.

5. The illuminator as recited in claim 2 wherein said plastic is a thermoplastic and said light guide is fused with said wedge so as to reduce any reflection losses and cause light from said light guide to spread out within said plastic wedge.

6. The illuminator as recited in claim 5 wherein said front surface is integrally formed with the surface area to be illuminated.

7. An illuminator for large surface areas comprising:
    a transparent wedge having back and front surfaces and a generally rectangularly shaped edge between said surfaces, said front surface being co-extensive with an area to be illuminated;
    a high efficiency light source;
    at least one light guide optically coupling light from said light source to said rectangular shaped edge so that light entering the wedge is internally reflected from the back surface and emitted from said front surface,
    wherein said transparent wedge is provided with scattering centers throughout its volume and,
    wherein the number of scattering surfaces increases along a distance moving away from said rectangular shaped edge.

8. The illuminator as recited in claim 7 wherein said at least one light guide is coupled to said wedge immediately adjacent and parallel to said rectangular edge and said rectangular edge is serrated to reflect light from said light guide toward said back and front surfaces.

9. The illuminator as recited in claim 8 further comprising a reflective coating applied to said back surface.

10. The illuminator as recited in claim 9 wherein said reflective coating is of a diffuse type.

11. The illuminator as recited in claim 7 wherein said scattering centers are grooves formed in said volume perpendicular to a direction of propagation of the light within said wedge and having a frequency of occurrence which increases away from said rectangular shaped edge.

12. The illuminator as recited in claim 7 wherein said scattering centers are pits formed in said and have a density which increases away from said rectangular shaped edge.

13. The illuminator as recited in claim 7 wherein said back surface is grooved to form stepped risers perpendicular to the direction of light propagating within said wedge whereby light is reflected from said stepped risers toward said front surface.

14. The illuminator as recited in claim 13 further comprising a reflective coating applied to said back surface.

15. An illuminator for large surface areas comprising:
 a plurality of transparent wedges having respective front and back surfaces, at least one of respective front and back surfaces converging at a generally rectangular shaped converging edge, said front surfaces of said plurality of said transparent wedges being coextensive with an area to be illuminated;
 a high efficiency light source;
 at least one light guide optically coupling light from said light source to an edge on each of said plurality of transparent wedges other than said converging edge, said at least one light guide being effective so that light entering each of said transparent wedges is internally reflected from respective of said back surfaces and emitted from said respective front surfaces; and
 wherein said plurality of transparent wedges are provided with scattering centers throughout their volumes, the number of said scattering centers increasing towards said converging edge.

16. The illuminator as recited in claim 15 wherein the number of wedges is said converging edge occurs along a common edge where said back and front surfaces of each wedge converge and the front surfaces of said two wedges form a common illuminating surface conforming to a surface area to be illuminated.

17. The illuminator as recited in claim 16 wherein there are at least two light guides, one for each of said two wedges, and each light guide is coupled to a corresponding one of said plastic wedges immediately adjacent and parallel to the rectangular edge of that wedge and said rectangular edge is serrated to reflect light from said light guide toward said converging back and front surfaces.

18. The illuminator as recited in claim 17 further comprising a reflective coating applied to said back surfaces.

19. The illuminator as recited in claim 17 wherein said reflective coating is of a diffuse type.

* * * * *